United States Patent
Berginc (10) Patent No.: US 8,356,823 B1
(45) Date of Patent: Jan. 22, 2013

(54) ADJUSTABLE WHEELBARROW CHAIR

(76) Inventor: Paul Berginc, Jeannette, PA (US)

( * ) Notice: Subject to any disclaimer, the term of this patent is extended or adjusted under 35 U.S.C. 154(b) by 0 days.

(21) Appl. No.: 13/187,872

(22) Filed: Jul. 21, 2011

(51) Int. Cl.
*B62B 7/12* (2006.01)
*B62B 1/00* (2006.01)
*A47C 13/00* (2006.01)

(52) U.S. Cl. .................. 280/30; 280/47.31; 297/129

(58) Field of Classification Search ............ 280/30, 280/47.31; 297/129
See application file for complete search history.

(56) References Cited

U.S. PATENT DOCUMENTS

| | | | |
|---|---|---|---|
| 8,604 A | 12/1851 | Wyllys | |
| 2,037,222 A * | 4/1936 | Farrar | 298/3 |
| 2,442,552 A | 6/1948 | Seay | |
| 2,852,304 A * | 9/1958 | Harrison | 298/3 |
| 2,889,152 A | 6/1959 | Hurst et al. | |
| 2,967,058 A * | 1/1961 | Hoffmann, Jr. | 280/30 |
| 3,092,418 A * | 6/1963 | Themascus | 298/3 |
| 3,227,467 A | 1/1966 | Fugitt, Sr. | |
| 4,270,786 A * | 6/1981 | Mattox | 298/3 |
| 4,789,171 A * | 12/1988 | Porter | 280/47.18 |
| 5,040,807 A | 8/1991 | Snover | |
| 5,350,030 A * | 9/1994 | Mawhinney et al. | 180/19.3 |
| 5,518,295 A | 5/1996 | Westerburgen | |
| D527,157 S * | 8/2006 | Boon | D34/16 |
| 2004/0061372 A1* | 4/2004 | Messinger-Rapport | 298/3 |

* cited by examiner

*Primary Examiner* — Milton Nelson, Jr.
(74) *Attorney, Agent, or Firm* — James Ray & Assoc (57) ABSTRACT

A wheelbarrow convertible to an adjustable-tilt chair includes a pair of spaced-apart elongated rails, a wheel and axle assembly operably attached adjacent the distal ends of the elongated rails, two support legs, a hopper having two side walls, a bottom member, a front panel, and a seat panel. A pivot rod is rotatably attached to the pair of rails and to a first underside portion of the hopper bottom. Additionally, a brace is hingedly attached at one end to a second underside portion of the hopper bottom, the brace including an elongated rod at an opposite end which adjustably engages with at least one adjustment bracket having a plurality of notches communicating with apertures for engagement with the elongated rod.

17 Claims, 7 Drawing Sheets

ADJUSTABLE WHEELBARROW CHAIR

FIELD OF THE INVENTION

The present invention relates, in general, to an outdoor material hauling apparatus and, more particularly, this invention relates to wheelbarrows convertible to chairs.

BACKGROUND OF THE INVENTION

Prior to the conception and development of the present invention, wheelbarrows typically have been used for just transporting material within ones yard or a work area, and generally sit unused. The concept of having a cart or wheelbarrow convert into a chair goes at least back to U.S. Pat. No. 8,604 to Lee. Lee teaches a four-wheel cart that is convertible to a chair. As a chair, the seat is barely off the ground, and there is no adjustment means for the back.

Seay is U.S. Pat. No. 2,442,552 disclosed a wheelbarrow that could convert to a rocking chair when turned upside down. The top edge of the sidewall has to be continuously arcuate for satisfactory operation as a rocking chair.

Hurst et al disclosed in U.S. Pat. No. 2,889,152 a two-wheel cart that could convert to lawn furniture by rotating the cargo tub and friction locking at a seat position such that the occupant would sit above the wheels.

In U.S. Pat. No. 3,227,467, Fugitt discloses a platform cart that can also serve as a chair, but is has essentially no ability to carry loads of loose material.

Snover teaches in U.S. Pat. No. 5,040,807 a single-wheel beach chair—cart combination. It consists essentially of a tubular frame supporting a flexible fabric. It also has no sidewalls for containing loads of loose material as conventional wheelbarrows do. The present invention aims to improve on the prior art.

SUMMARY OF THE INVENTION

The present invention provides a wheelbarrow convertible to an adjustable-tilt chair including a pair of spaced-apart elongated rails, a wheel and axle assembly operably attached adjacent the distal ends of the elongated rails, two support legs, a hopper body having two side walls, a bottom member, a front panel, and a seat panel. A pivot rod is rotatably attached to the pair of rails and to a first underside portion of the hopper bottom. Additionally, a brace is hingedly attached at one end to a second underside portion of the hopper bottom, the brace including an elongated rod at an opposite end which engages with at least one adjustment bracket having a plurality of notches communicating with apertures for engagement with the elongated rod.

The front panel may swing down for easier unloading, and there are optional ways to add shelving in various locations.

OBJECTS OF THE INVENTION

It is, therefore, one of the primary objects of the present invention to provide a wheelbarrow that can readily convert to a chair.

Another object of the present invention is to provide an adjustable-tilt chair that can also serve as a wheelbarrow.

Still another object of the present invention is to provide a seat structure that converts to a wheelbarrow with high capacity for loose material.

Yet another object of the present invention is to provide a wheelbarrow that can covert to a chair with an adjustment mechanism that prevents tipping once engaged.

An additional object of the present invention is to provide a wheelbarrow-chair combination that also can offer display shelves.

In addition to the various objects and advantages of the present invention described with some degree of specificity above, it should be obvious that additional objects and advantages of the present invention will become more readily apparent to those persons who are skilled in the relevant art from the following more detailed description of the invention, particularly, when such description is taken in conjunction with the attached drawing figures and with the appended claims.

DETAILED DESCRIPTION OF A PRESENTLY PREFERRED AND VARIOUS ALTERNATIVE EMBODIMENTS OF THE INVENTION

Prior to proceeding to the more detailed description of the present invention it should be noted that, for the sake of clarity and understanding, identical components which have identical functions have been identified with identical reference numerals throughout the several views illustrated in the drawing figures.

Figure 1:
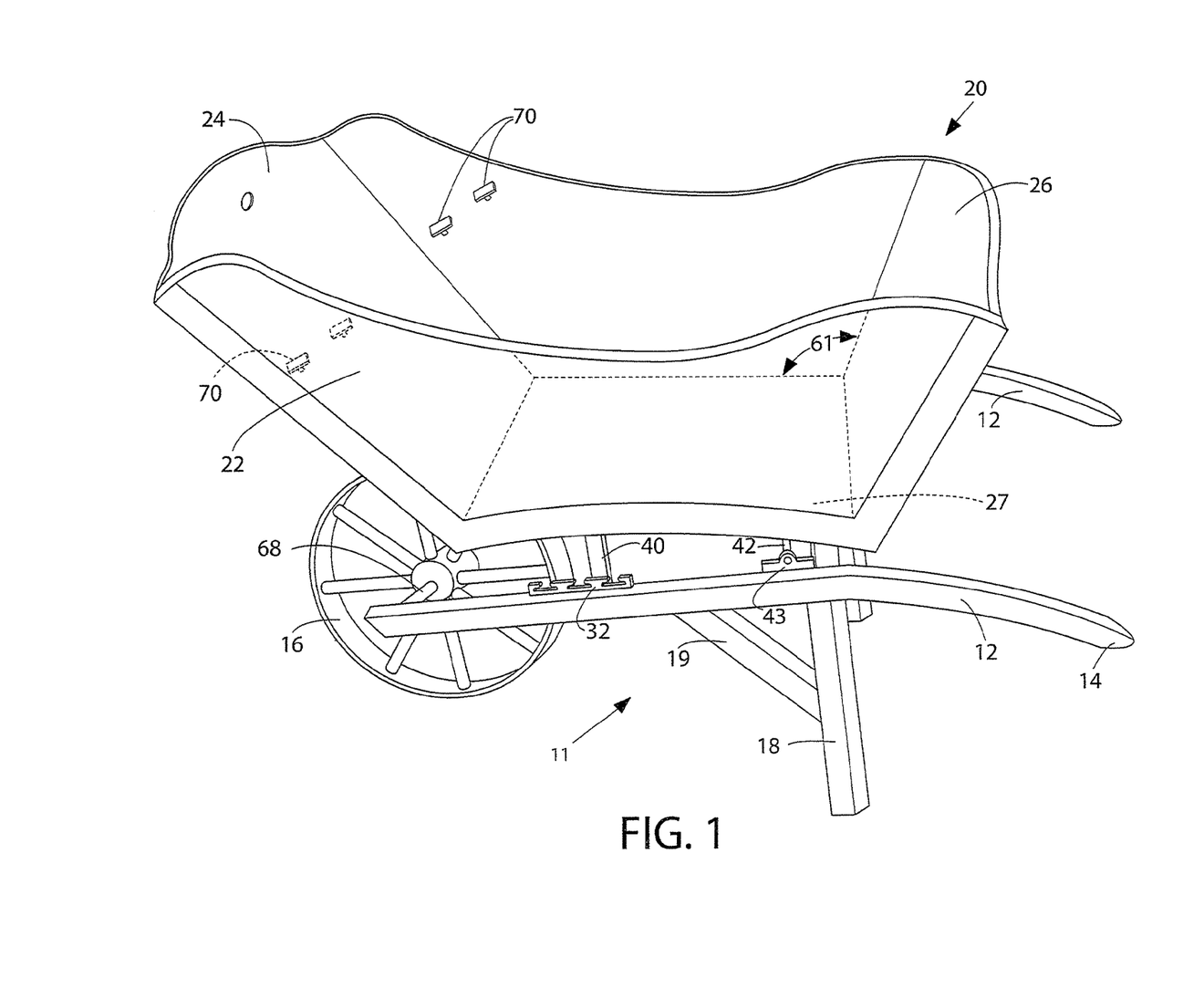
FIG. 1 is a perspective view of the present invention in a wheelbarrow mode.

Referring initially to FIG. 1, the present invention of the convertible wheelbarrow is shown generally as 10 in this perspective view. The wheelbarrow 10 has a frame, generally designated as 11. By way of an example only of FIG. 1, the frame 11 has two elongated rails 12, which may be of a round or rectangular cross section, having handle ends 14. An axle assembly, wherein a single wheel 16 is operably connected between the opposite ends of the rails 12 on an axle 68, is provided so that wheel 16 rotates during use of the convertible wheelbarrow 10. Support legs 18 are attached to rails 12 and extend generally vertically downward. Additional gussets or braces 19 are optional.

A hopper body 20 is also provided and is preferably disposed above the frame 11. It is further presently preferred to partially support the frame 11 on stop blocks 40 sitting above the rails 12. The hopper body 20 is a hollow body with an open top and is preferably constructed with two side walls 22, connected along three edges to a front panel 24, facing the wheel 16 in the instant invention, a bottom member 27, and a rear or seat panel 26. Preferably, the panels 24, and 26, and side walls 22, are generally planar, but they could be arcuate as well. The hopper body 20, rails 12, and support legs 18 can be constructed from any one of several materials or combination of materials including wood, metal, plastic, and reinforced thermoset resin (e.g., fiberglass). Optional shelf support tabs 70 may be installed on the inside of the side walls 22 for installation of a removable shelf (not shown).

The hopper body 20 must be free to pivot relative to the frame 11. Accordingly, there is means for pivotally attaching the hoper body 20 to the frame 11. It is presently preferred for such pivoting means to include an elongated member, such as a pivot bar 42 that spans the two rails 12 in a direction substantially perpendicular to them. As shown, each end of the pivot bar 42 is rotatably engaged with a pillow-block bearing 43 that permits free rotation of the pivot bar 42, which is fixedly attached to the backside of the hopper bottom 27. The pillow blocks 43 are spaced apart on top of the frame 11 and, more particularly, each pillow block 43 is secured to a respective rail 12. Other forms of pivotal engagement would also be acceptable, for example, pins adjacent the hopper body corners. Another would be an elongated bar extending through apertures in the elongated rails with cotter pins at the ends of the elongated bar.

In use, the hopper body 20 is pivoted between a wheelbarrow mode, wherein the bottom member 27 is disposed generally parallel to the plane of the frame 11 and a chair mode wherein the bottom member 27 is disposed at an inside angle to the plane of the frame 11. For better use as a chair, it is preferred that the inside angle 61 between the bottom member 27 and the seat panel 26 be between about 92 and about 150 degrees.

Figure 2:
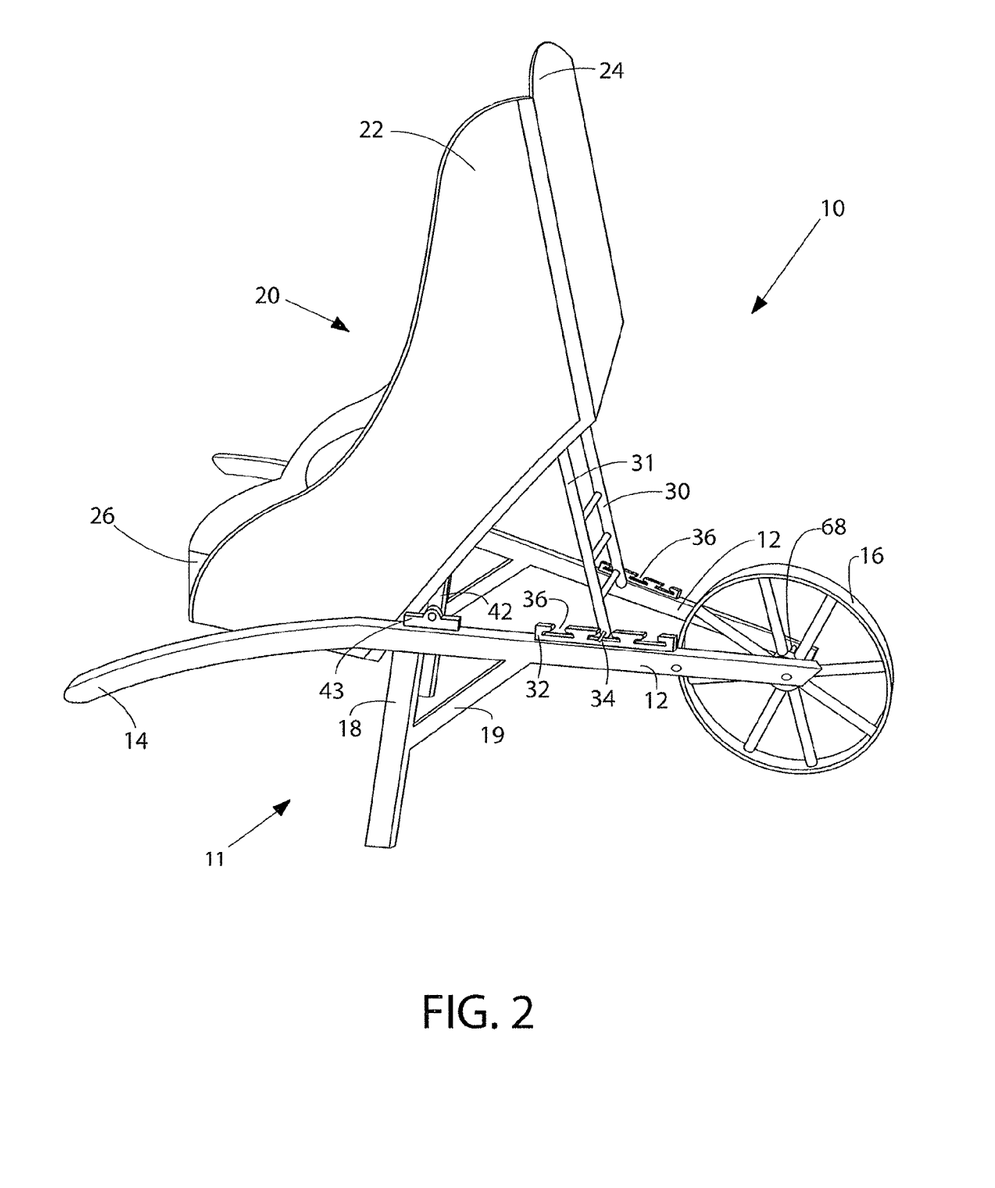
FIG. 2 presents a perspective view of the present invention in a chair mode.

In FIG. 2, the present invention 10 is shown in a side perspective view in a chair position. The hopper body 20 has been rotated around the pivot bar 42 into a chair mode so that a person can sit on the seat panel 26. Preferably, the hopper body 20 is held in the chair position with an adjustment brace 30 which is hingedly attached at one end with a hinge mechanism 39 to the underside of the bottom member 27 in FIG. 1. At the end of the brace 30 opposite the hinged attachment, rods or pegs 37 removably and securely engage notches 36, 38 of the adjustment brackets, generally designated as 32, mounted on the top side of the rails 12. The wheel 16 helps to counterbalance the weight of the person sitting on the seat 26, and the legs 18 support weight and maintain the position of the chair on whatever surface it resides. Forward rotation due to weight on the front of the seat panel 26 is prevented by notches 36 and apertures in the adjustments brackets 32.

Figure 3:
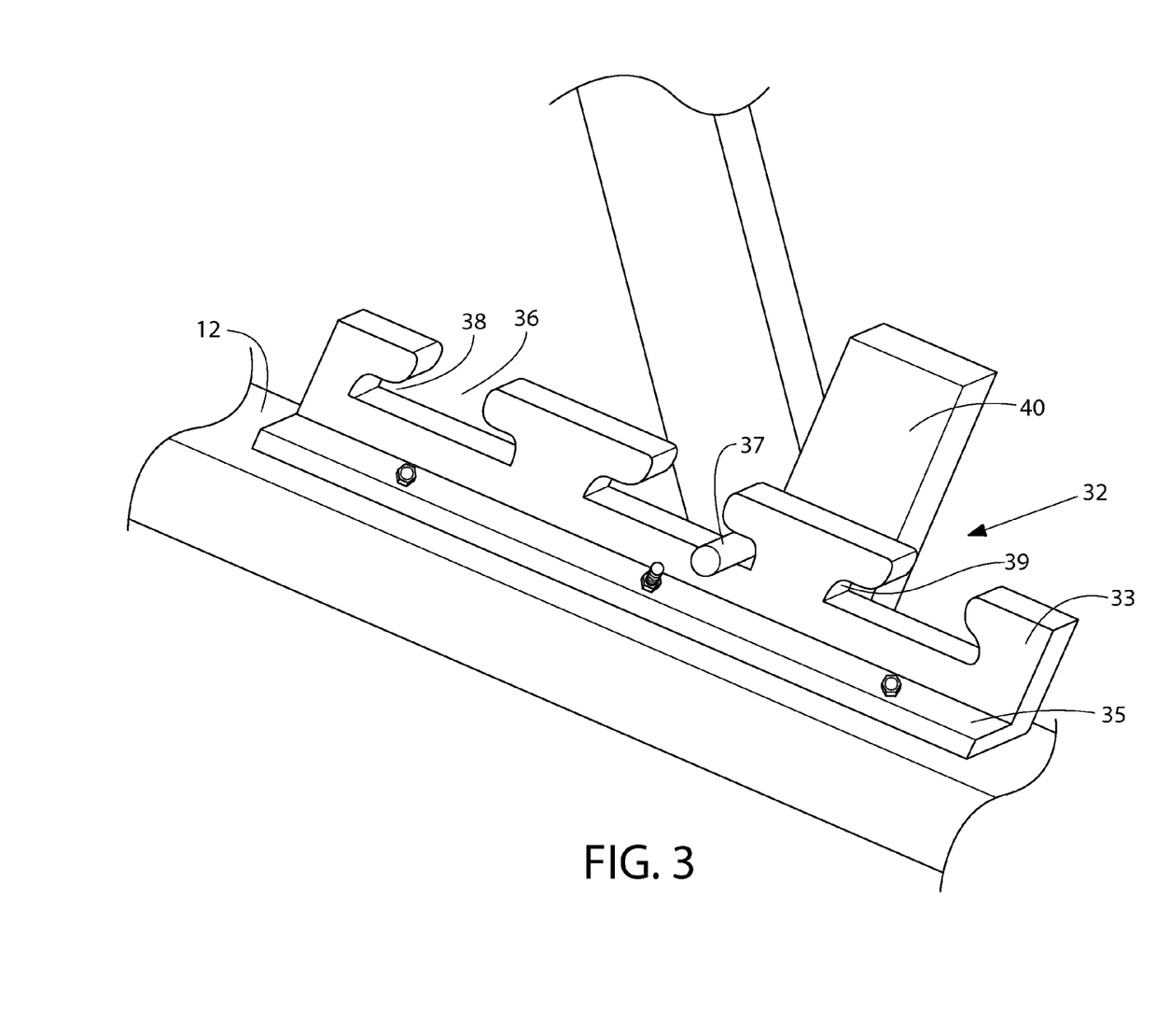
FIG. 3 provides a perspective close-up view of an adjustment bracket of the present invention.

FIG. 3 presents a perspective close-up view of the adjustment bracket 32 in a presently preferred embodiment of the present invention. This adjustment bracket 32 is a key part of the present invention because it provides means for adjustable yet secure positioning of the hopper body 20 for the chair mode of use with easy return of the hopper body 20 to the wheelbarrow mode. More specifically, adjustment brackets 32 provides means that allow the bottom member 27 to be positioned at different tilt angles relative to the plane of the frame 11, defined by rails 12. The angle-shaped adjustment bracket 32 has a horizontal flange 35 bolted or otherwise fixedly attached to the top of elongated rail 12. It may be adjacent the stop block 40 that partially supports the hopper body 20 when it is in the wheelbarrow mode. The vertical flange 33 has a plurality, at least two, of notches 36 spaced out along the top edge of the vertical flange 33. These notches 36 are preferably just slightly wider than the diameter or width of the horizontal rod or pegs 37 extending outward from an elongated leg 31 of the previously mentioned brace 30. Typically, the notch width will be between about one-half and one inch. The notches 36 are in open communication with apertures 38, which preferably will be oval or rectangular in shape and are wider longitudinally than the notches 36, with the longer dimension being in the same direction as the length of the bracket 32. Each aperture 38 is in communication with a respective notch defining one of a T-shaped or L-shaped opening with at least one lobe 39 extending toward the handle end. This provides the desirable non-tilt engagement needed since the hopper body 20 can freely pivot around the pivot bar 42 or elongated members or pins 37. With the apertures 38 extending generally normal to the slot 36, unwanted disengagement from the slots 36 is prevented when someone sits on the seat panel 26. Although a pair of adjustment brackets 32 have been illustrated, one adjustment bracket has been found sufficient in supporting the hopper body in the chair mode.

Figure 4:
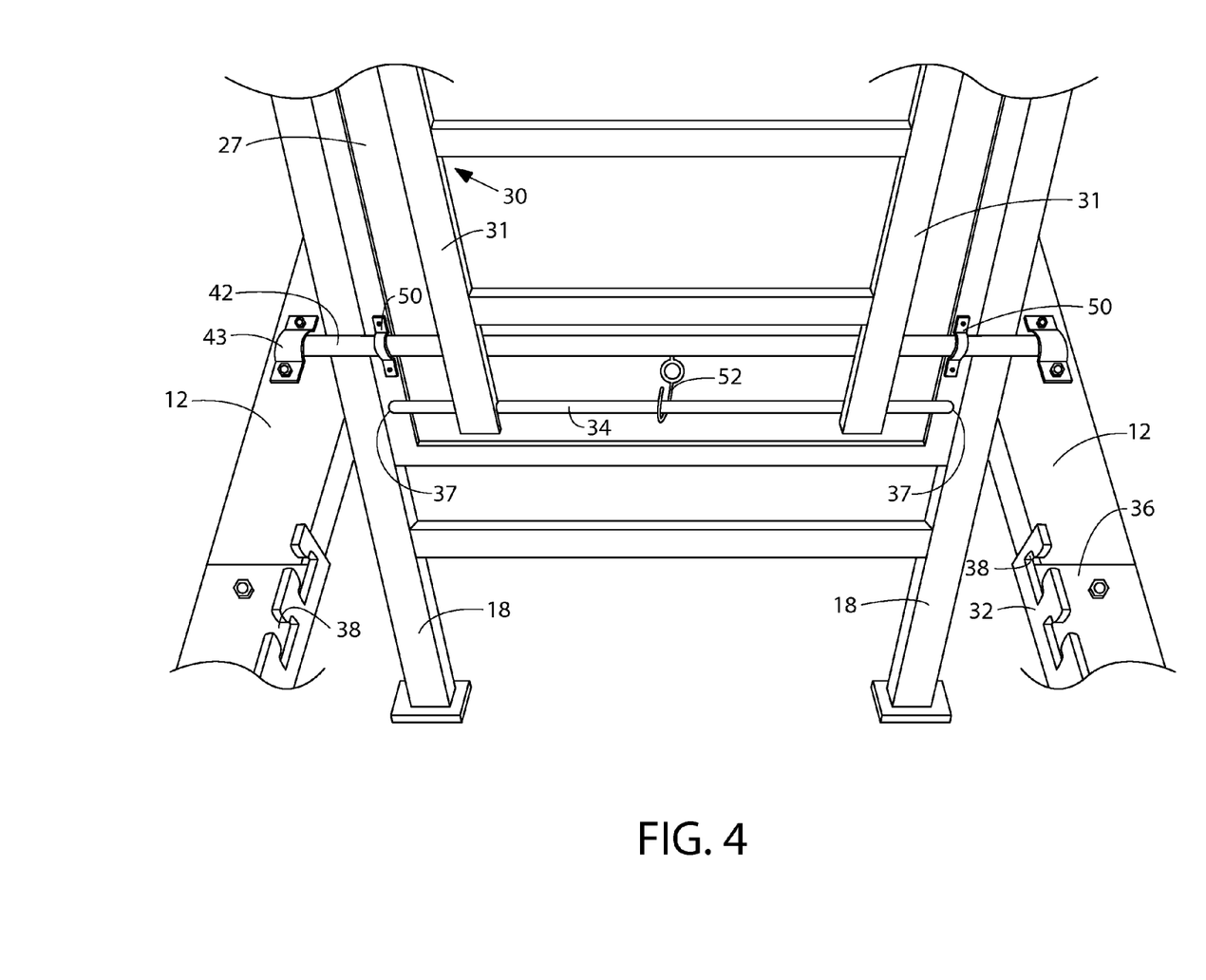
FIG. 4 provides a partial perspective view of the back of the present invention about to be set in the chair mode.

FIG. 4 provides a partial perspective view of the back of the present invention about to be secured in a chair mode. The bottom member 27 of the hopper body 20 is connected to the pivot bar 42 with a fastening means 50, which may be rigid straps or optionally pillow-block bearings. The pivot rod 42 is pivotally secured to the rails 12 with fastening means, such as above-described pillow-block bearing 43. Other rotatable attachment means would be acceptable as well, and the present invention is not limited in that respect. The adjustment brackets 32 are shown attached to the top of rails 12. The adjustment brace 30 further includes an elongated member 34 which is disposed generally transverse to the legs 31 and has ends 37 that extend past the legs 31. An optional hook 52 engages the elongated member 34 holding the brace 30 in an up position while in wheelbarrow mode. When released from the hook 52, the brace 30 can be rotated such that the elongated members 37 being the ends of the elongated member 34 can engage with any pair of the notches 36 in the brackets 32. Moving to a different pair of notches offers a different tilt angle for the hoper body 20 in the chair mode.

Figure 5:
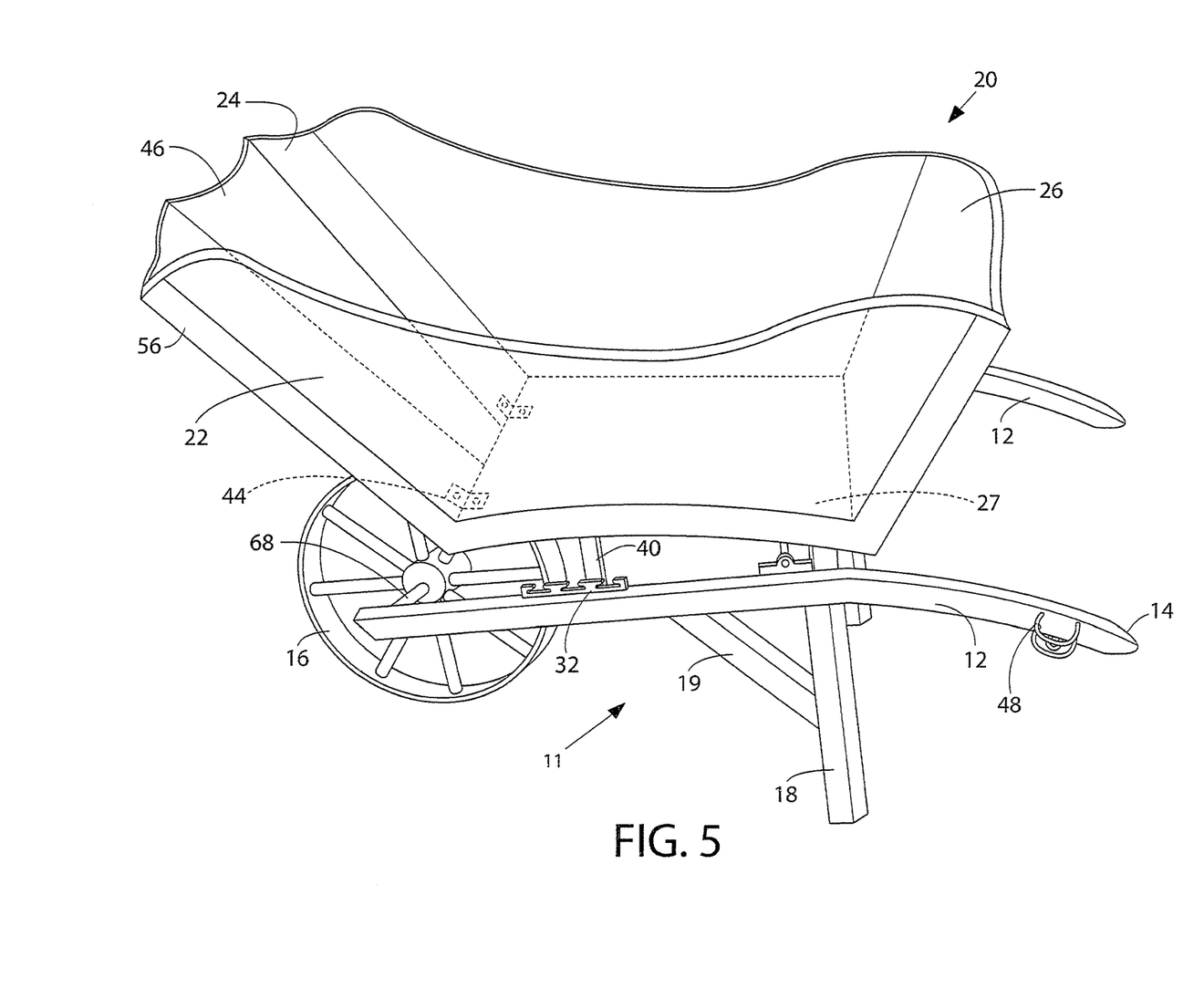
FIG. 5 presents another perspective view of the present invention.

FIG. 5 presents another perspective view of the present invention, wherein the front panel 24 is now pivotally connected to the bottom member 27, preferably with hinges 44, and is releasably attached to a edge portions 56 of the sidewalls 22. The front panel 24 may also optionally have an inwardly disposed arcuate center portion 46 to better accommodate the wheel 16 when the hopper body 20 is pivoted into the chair mode. Another option shown is that of cup holders 48 in the rails 12 near the handles 14.

Figure 6:
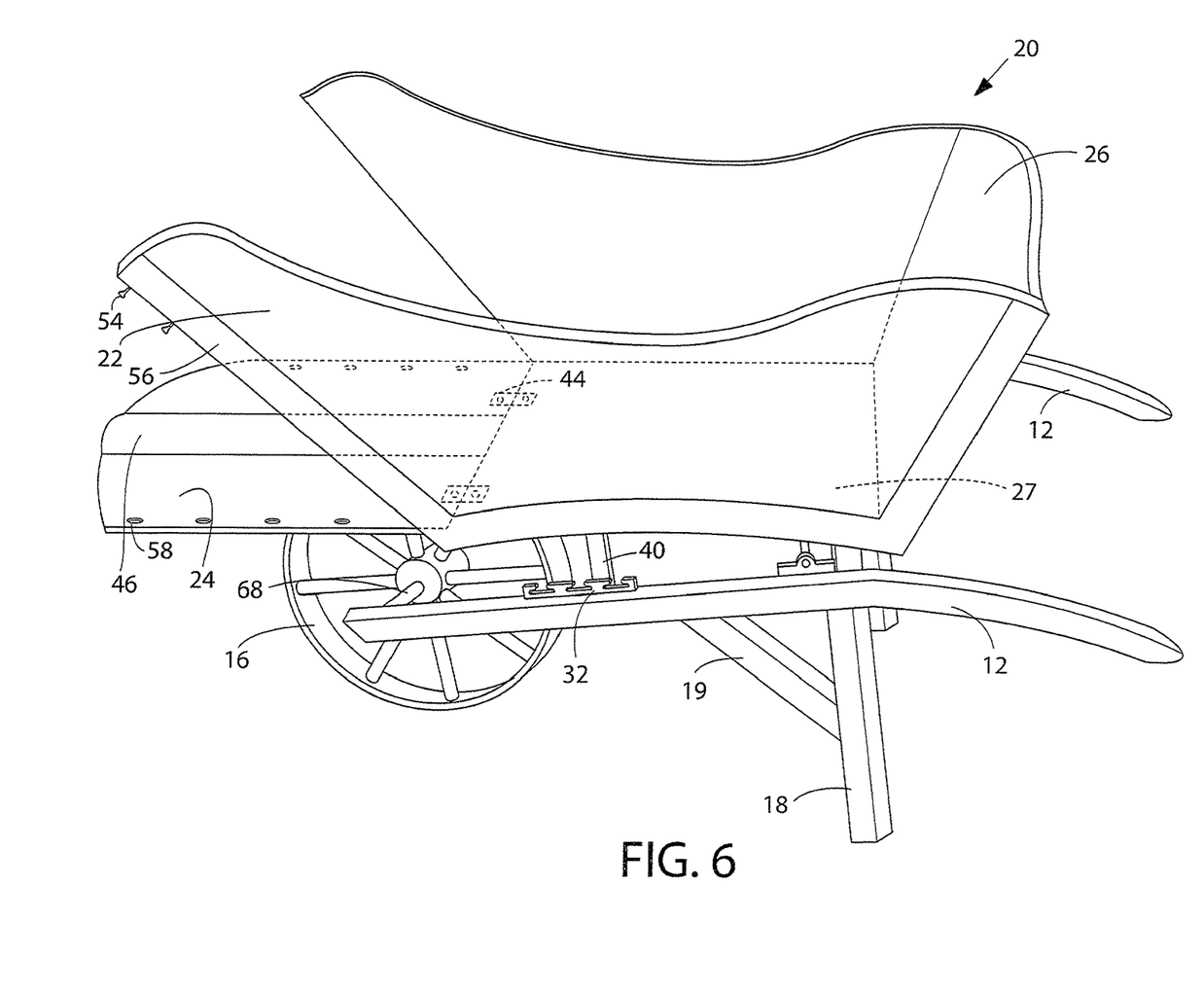
FIG. 6 provides an additional perspective view of the present invention of FIG. 5.

FIG. 6 provides an additional perspective view of the convertible wheelbarrow of FIG. 5. The releasable attachment means for the front panel 24 has been disengaged and the front panel 24 is lowered into a position with the arcuate center portion 46 resting on the wheel 16. This would be done to facilitate removal of the load from the wheelbarrow hopper body 20. The releasable attachment means are shown as thumbscrews 54 and slots 58, but may be selected from many other possibilities.

Figures 7, 8:
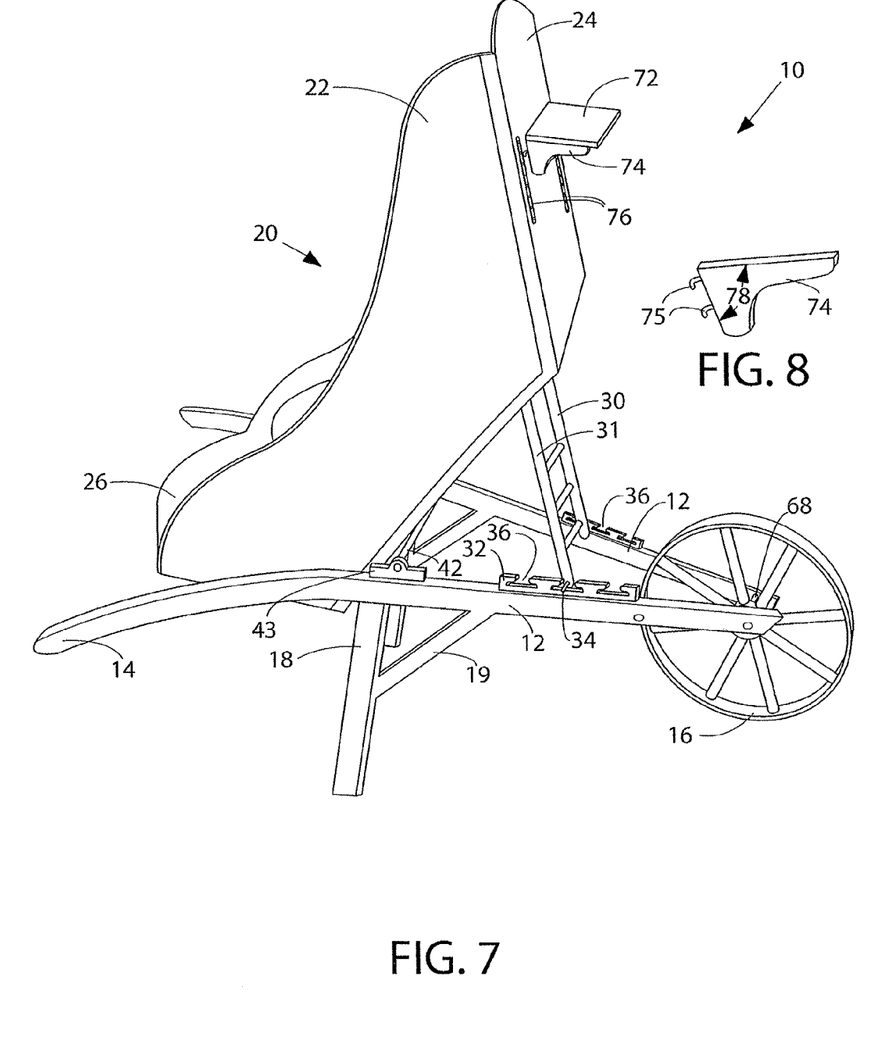
FIG. 7 provides yet another perspective view of the present invention.
FIG. 8 provides a detail perspective view of the shelf bracket portion of FIG. 7.

FIG. 7 provides a perspective view of another optional feature, a removable shelf 72 on the back side of the front panel 24 for use when in the chair mode. Two parallel slotted strips 76 are fastened to the back side of the front panel 24. Two L-shaped shelf brackets 74 have curved tabs which engage with the slotted strips 76 in order to support the shelf 72. FIG. 8 provides a detail view of the L-shaped bracket 74, which has curved tabs 75 to engage with the slots in the shelf brackets. The brackets 74 are unconventional, however, in that the angle 78 is between about 60 and about 85 degrees in order to accommodate the slant of the front panel 24 and still have a generally horizontally disposed shelf 72.

Although the instant invention has been shown and described with pivot member 42 being a continuous member having ends extending past the side edges of the hopper body 20, it is within the scope of the instant invention to provide such pivot member 42 as a pair of members, each attached to one side of the hopper body 20. This will allow the hopper body 20 to be at least partially disposed between rails 12. Ends 37 will be then adapted to provide required support and adjustments.

While a presently preferred and various alternative embodiments of the present invention have been described in sufficient detail above to enable a person skilled in the relevant art to make and use the same, it should be obvious that various other adaptations and modifications can be envisioned by those persons skilled in such art without departing from either the spirit of the invention or the scope of the appended claims.

What is claimed is:

1. A wheelbarrow convertible to an adjustable-tilt chair comprising:
   a) a pair of spaced-apart elongated rails each having a handle end, a distal end, and a predetermined shape;
   b) a wheel and axle assembly operably attached adjacent said distal ends of said elongated rails;
   c) a hopper body having two side walls, a bottom member, a front panel, and a seat panel;
   d) a means for pivoting said hopper body angularly to said rails between a wheelbarrow mode and a chair mode;
   e) at least one adjustment bracket disposed on at least one of said elongated rails and having a plurality of notches communicating with apertures;
   f) a brace hingedly attached at one end thereof to said hopper body and adjacent said front panel thereof, said brace including at least one elongated member positioned relative to said hopper body and having a length so as to operably engage with said at least one adjustment bracket; and
   g) two leg supports connected generally perpendicular to said rails.

2. The wheelbarrow convertible to an adjustable-tilt chair, according to claim 1, wherein said wheel and axle assembly is a single wheel on an axle rod connecting distal ends of said rails.

3. The wheelbarrow convertible to an adjustable-tilt chair, according to claim 1, wherein an angle between said seat panel and said bottom member is between about 92 and about 150 degrees.

4. The wheelbarrow convertible to an adjustable-tilt chair, according to claim 1, wherein said plurality of notches in said at least one adjustment bracket is three.

5. The wheelbarrow convertible to an adjustable-tilt chair, according to claim 1, wherein said front panel is releasably connected to said side walls and hingedly attached to said bottom member.

6. The wheelbarrow convertible to an adjustable-tilt chair, according to claim 1, wherein said pivot means is a pivot rod rotatably attached substantially perpendicular to said pair of elongated rails and also attached to an underside portion of said bottom member.

7. The wheelbarrow convertible to an adjustable-tilt chair, according to claim 6, wherein said pivot rod attaches to the top of said elongated rails with pillow-block bearings.

8. The wheelbarrow convertible to an adjustable-tilt chair, according to claim 1, wherein each aperture in communication with a respective notch defines one of a T-shaped or L-shaped opening with at least one lobe extending toward said handle end.

9. The wheelbarrow convertible to an adjustable-tilt chair, according to claim 1, wherein said pivot means is a pair of pins rotatably attached substantially perpendicular to said pair of rails and also attached to underside portions of said bottom member.

10. The wheelbarrow convertible to an adjustable-tilt chair, according to claim 1, wherein said predetermined shape of said elongated rail is arcuate with a rectangular cross section.

11. The wheelbarrow convertible to an adjustable-tilt chair, according to claim 1, wherein said side walls further include shelf-support tabs.

12. A wheelbarrow convertible to a chair comprising:
   a) a pair of spaced-apart elongated rails each having a handle end, a distal end, and a predetermined shape;
   b) an axle connected normal to said elongated rails adjacent to and spanning a gap between said distal ends;
   c) a single wheel rotatably attached to said axle between said distal ends of said spaced-apart elongated rails;
   d) an elongated rod attached substantially normal to said elongated rails in a generally central portion thereof;
   e) a hopper body having two side walls, a bottom member, a front panel, and a seat panel;
   f) an adjustment member disposed on each of said pair of spaced-apart elongated rails, said adjustment member including:
      i) one elongated L-shaped bracket having a vertical flange and a horizontal flange fixedly attached to the top of and axially parallel to said each elongated rail;
      ii) a plurality of top-edge notches with a first predetermined width in said vertical flange of said L-shaped bracket;
      iii) apertures in open communication with said top-edge notches, said apertures having a second predetermined width and a predetermined length, wherein said second predetermined width is greater than said first predetermined width and said predetermined length is greater than said second predetermined width and in a direction substantially normal to said top-edge notch;
   g) a tilt-adjustment brace rotatably attached at one end to an underside of said bottom member of said hopper body, wherein said adjustment brace further includes an elongated rod at a second end for removable engagement with said top-edge notches; and
   h) a pair of elongated legs disposed generally perpendicular to and having one end attached to said elongated rails.

13. The wheelbarrow convertible to a chair, according to claim 12, wherein said predetermined shape of said elongated rail is arcuate with a rectangular cross section.

14. The wheelbarrow convertible to a chair, according to claim 12, wherein said front panel of said hopper body includes an inwardly disposed arcuate portion.

15. The wheelbarrow convertible to a chair, according to claim 12, wherein said predetermined width of said notches is between about one-half and about one inch.

16. The wheelbarrow convertible to a chair, according to claim 12, and further including two parallel slotted strips fastened to a back side of said front panel, two L-shaped shelf brackets having curved tabs adapted to engage with said slotted strips and shelf supported on said shelf brackets.

17. A convertible wheelbarrow comprising:
   a) a frame;
   b) a hopper body disposed above said frame;
   c) a mechanism for pivoting said hopper body between a wheelbarrow mode wherein a bottom member of said hopper body is disposed generally planar with said frame and a chair mode wherein said bottom member is disposed at an angle to said plane of said frame, wherein said pivoting mechanism includes a first elongated member secured to said bottom member of said hopper body in a direction generally transverse to a length of said frame and a pair of spaced apart pillow blocks, each of said pair of pillow blocks secured to said frame and sized to receive an end of said first elongated member; and d) an angle adjusting means including:
   (i) a brace hingedly attached at one end to said hopper body;
   (ii) a second elongated member secured to said brace and having a pair of ends extending past the side edges of said brace; and
   (iii) at least one adjustment bracket having a plurality of notches sized for engagement with at least one end of said second elongated member.

\* \* \* \* \*